No. 630,291.
W. LANE & A. DONEY.
CHANGEABLE GEAR FOR BICYCLES.
(Application filed Jan. 11, 1898.)
Patented Aug. 1, 1899.
(No Model.)
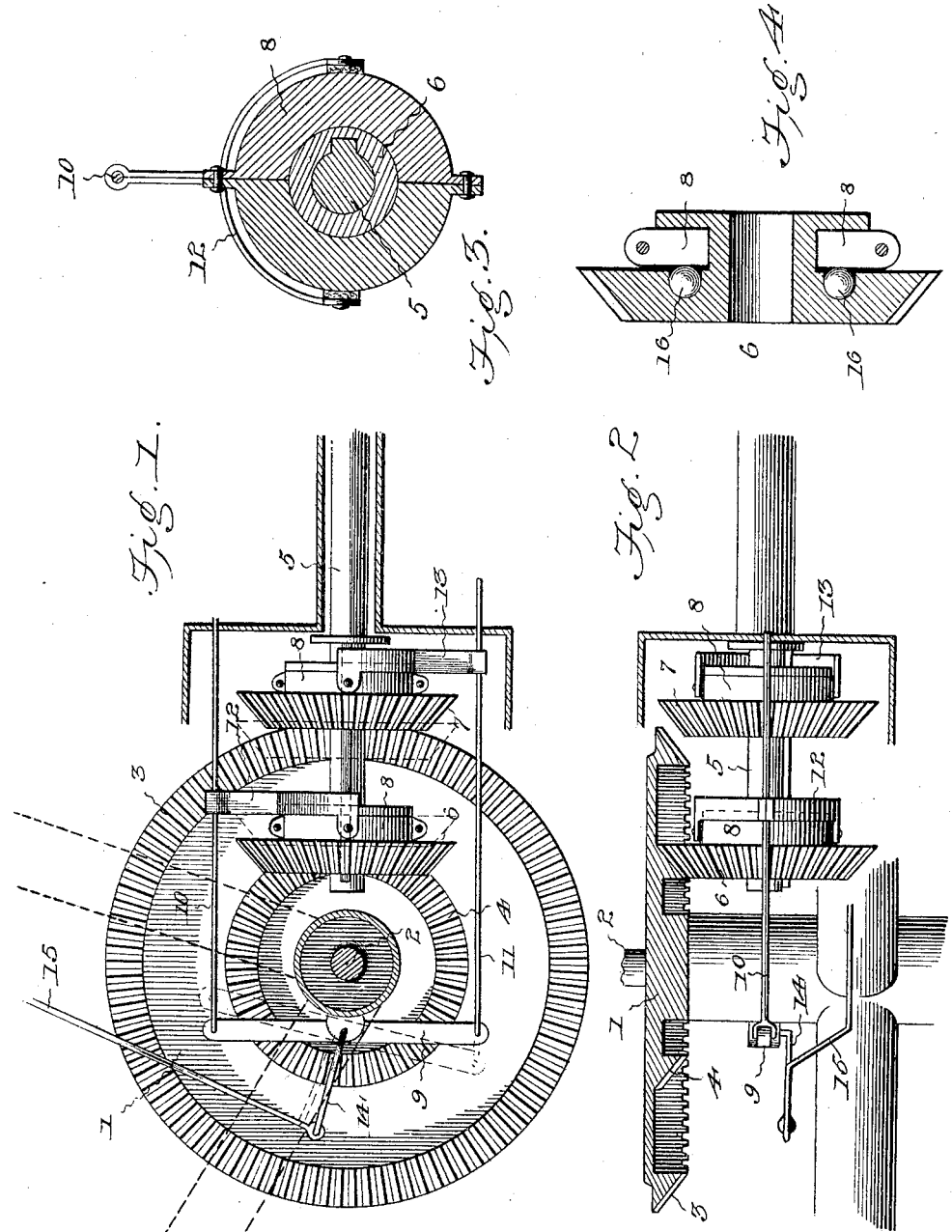
Witnesses
E. N. Moure
V. B. Hillyard
William Lane
Alfred Doney
Inventors
By their Attorneys.
C. A. Snow & Co.

UNITED STATES PATENT OFFICE.

WILLIAM LANE AND ALFRED DONEY, OF PEN ARGYL, PENNSYLVANIA, ASSIGNORS OF ONE-THIRD TO L. W. MORSE, OF SCRANTON, PENNSYLVANIA.

CHANGEABLE GEAR FOR BICYCLES.

SPECIFICATION forming part of Letters Patent No. 630,291, dated August 1, 1899.

Application filed January 11, 1898. Serial No. 666,271. (No model.)

*To all whom it may concern:*

Be it known that we, WILLIAM LANE and ALFRED DONEY, citizens of the United States, residing at Pen Argyl, in the county of Northampton and State of Pennsylvania, have invented a new and useful Changeable Gear for Bicycles and the Like, of which the following is a specification.

This invention has relation to the propelling mechanism of bicycles and machines of kindred nature, and which provides for speeding or hill-climbing, as required, and which can be thrown out of gear to allow for coasting when desired, the several adjustments being effected without requiring the stopping of the machine or the dismounting of the rider.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a view in elevation showing the operation of the changeable gear by dotted lines. Fig. 2 is a plan view, parts being broken away. Fig. 3 is a transverse section showing a yoke or shipper in elevation. Fig. 4 is a detail section of a shiftable gear on a larger scale.

Corresponding and like parts are referred to in the following description and indicated in the views of the drawings by the same reference characters.

Within the scope of the invention the relative location of the gearing is immaterial so long as the desired end is attained, and it may be placed in direct connection with the drive-wheel of the machine or with the crank-axle, and in order to simplify the illustration it is shown in connection with the crank-axle of a bicycle.

A gear-wheel 1 is secured upon the crank-axle 2 so as to turn therewith and is provided with differential gearing 3 and 4, the inner cog-gearing 4 being of less diameter than the cog-gearing 3 and on the same side of the wheel therewith. The power-transmitting shaft 5 is disposed at right angles to the crank-axle 2 and conveys the power therefrom to the rear or drive wheel of the machine. Pinions 6 and 7 are slidably mounted upon the shaft 5 and are keyed so as to rotate therewith. These pinions are disposed so that when one intermeshes with a cog-gearing of the wheel 1 the other is out of mesh, thereby admitting of power or speed being secured, as required. These pinions are also related with reference to the cog-gearing 3 and 4 so as to be thrown out of mesh with each, which is desirable when coasting. Any suitable means may be provided for connecting the pinions with the shaft 5 to admit of their moving on the shaft and causing them and the shaft to turn together at any stage of their adjustment. Each of the pinions has an extension at one side which is annularly grooved to receive a ring 8, seated in the groove and composed of parts which are bolted or otherwise secured together.

A lever 9 is fulcrumed between its ends to a suitable part of the framework, and rods 10 and 11 have pivotal connection therewith upon opposite sides of its fulcrum, so as to move in opposite directions at the same time. A yoke 12 is secured to the rod 10 and embraces the ring or collar applied to the pinion 6, and the end portions of its members have pivotal connection with the said collar at diametrically opposite points. A yoke 13, similar in construction to the yoke 12, is firmly connected with the rod 11, and its members have pivotal connection with the ring or collar fitted to the projecting portion of the pinion 7. It will thus be seen that upon operating the lever 9 in one direction the pinions 6 and 7 will be caused to move in opposite directions, the one out of gear and the other into gear with the cog-gearing of the wheel 1. By moving the lever 9 in an opposite direction the relation of the pinions 6 and 7 will be changed, and the one previously in gear will be thrown out of mesh and the one out of mesh thrown into gear. The lever 9 may be operated in any convenient way, and, as shown, a crank-arm 14 has connection therewith and constitutes an end portion of the pivot upon which the said lever is mounted, and this crank-arm 14 is operated from a convenient point of the machine by means of a rod connection 15.

In order that the friction between the rings or collars 8 and the respective pinions may be reduced to the smallest amount possible, ball-bearings 16 are interposed between the inner edges of the rings and the opposing sides of the respective pinions. These ball-bearings are fitted into a groove formed in the side of the pinions contiguous to the rings and are held in place by the said rings when the latter are in proper position.

When power is desired, the pinion 6 is thrown into mesh with the inner cog-gearing 4, thereby enabling hill-climbing and the passage over rough and sandy roads to be accomplished with comparative ease. For speed upon level and good roads the pinion 7 is thrown into mesh with the cog-gearing 3, and when coasting the pinions are thrown to an intermediate point between their extreme movements, so as to be out of gear with the cog-gearing of the wheel 1.

Having thus described the invention, what is claimed as new, and desired to be secured by Letters Patent, is—

In a changeable gear for bicycles and the like, a gear-wheel having concentric gear-rings of different diameters, a shaft arranged substantially at right angles to the axis of said gear-wheel, a pair of spaced pinions longitudinally movable on said shaft and rotatable therewith, each of said pinions having an integral hub extension, a separate shipper-yoke for each pinion, having a loose ring connection with the hub extension thereof, a single lever 9 fulcrumed between its ends on a fixed part of the machine-frame and having projected laterally from the center thereof a crank-arm 14, a single rod 10 connected to one terminal of said lever and to the shipper-yoke for one of the pinions, a second rod 11, connected to the opposite terminal of said lever and with the shipper-yoke for the other of said pinions, whereby an oscillation of the lever in one direction will provide for a simultaneous movement of the two pinions respectively in opposite directions, and a rod connection 15 for the crank-arm 14, substantially as set forth.

In testimony that we claim the foregoing as our own we have hereto affixed our signatures in the presence of two witnesses.

WILLIAM LANE.
ALFRED DONEY.

Witnesses:
N. D. CHASE,
ALFRED U. WEAVER.